United States Patent [19]
Peters

[11] Patent Number: 4,962,136
[45] Date of Patent: * Oct. 9, 1990

[54] ELASTOMER-PTFE COMPOSITIONS, ADDITIVES, AND MANUFACTURING METHODS

[75] Inventor: William E. Peters, Danville, Ind.

[73] Assignee: Alphaflex Industries, Inc., Indianapolis, Ind.

[ * ] Notice: The portion of the term of this patent subsequent to Jun. 24, 2003 has been disclaimed.

[21] Appl. No.: 185,535

[22] Filed: Apr. 25, 1988

Related U.S. Application Data

[63] Continuation-in-part of Ser. No. 45,780, Apr. 29, 1987, which is a continuation of Ser. No. 806,504, Dec. 9, 1985, abandoned, which is a continuation-in-part of Ser. No. 642,128, Aug. 17, 1984, Pat. No. 4,596,839, which is a continuation-in-part of Ser. No. 499,349, May 31, 1983, abandoned, which is a continuation-in-part of Ser. No. 309,230, Sep. 16, 1981, abandoned.

[51] Int. Cl.$^5$ ............................................. C08K 7/00
[52] U.S. Cl. .................................... 523/220; 524/406
[58] Field of Search ................. 523/175, 220; 524/406

[56] References Cited

U.S. PATENT DOCUMENTS 4,596,839  6/1986  Peters ................................. 523/175

Primary Examiner—Joseph L. Schofer
Assistant Examiner—N. Sarofin
Attorney, Agent, or Firm—Willian Brinks Olds Hofer Gilson & Lione

[57] ABSTRACT

Compositions are disclosed containing an elastomer, particulate polytetrafluoroethytlene and an amount of molybdenum disulfide effective to permit their manufacture. The particulate polytetrafluoroethylene may include amounts from 25 percent by weight to 80 percent by weight, and/or include small amounts of fibrilated polytetrafluoroethylene. Also disclosed are additives for such compositions, and methods for preparing such compositions and additives using polytetrafluoroethylene and molybdenum disulfide, and improved compositions and products.

14 Claims, No Drawings

ELASTOMER-PTFE COMPOSITIONS, ADDITIVES, AND MANUFACTURING METHODS

This is a continuation-in-part of U.S. patent application Ser. No. 07/045,780 filed Apr. 29, 1987, which is a continuation of application Ser. No. 06/806,504 filed Dec. 9, 1985 (now abandoned), which is a continuation-in-part of application Ser. No. 06/642,128 filed Aug. 17, 1984 (now U.S. Pat. No. 4,596,839), which is a continuation-in-part of U.S. patent application Ser. No. 499,349 filed May 31, 1983 (now abandoned), which, in turn, is a continuation-in-part of U.S. patent application Ser. No. 309,230 filed Sep. 16, 1981 (also abandoned).

Technical Field

This invention relates to new compositions, articles comprised of new compositions and new methods of manufacture. More particularly, this invention relates to elastomer-polytetrafluoroethylene compositions, elastomer additives, methods of manufacture, and articles manufactured with such compositions and additives having remarkably increased durability in their applications.

Background Art

It has long been a desire to combine the properties of an elastomer, such as rubber, and polytetrafluoroethylene, referred to frequently as PTFE. Past efforts to manufacture compositions with beneficial combined properties have not been wholly successful. In addition, the past attempts to incorporate PTFE into rubber, for example, have been generally limited to attempts and compositions containing no more than 20 percent by weight of PTFE. Such compositions have failed to provide a sufficient combined benefit from the properties of PTFE and elastomers to have great commercial importance. Higher percentages of PTFE could not be obtained because of the inability to uniformly mix the PTFE particulate matter with the elastomer composition. It is believed the difficulties of obtaining uniform mixtures and higher percentages of PTFE were the result of PTFE's unique properties, and probably the properties of its surface which resist wetting. Because of these properties, uniform mixing and bonding of PTFE particulate material and natural and synthetic rubbers have not been achieved in compositions with any commercially significant incorporation of PTFE.

Disclosure of Invention

This invention is based on the discovery of new compositions, including an elastomer, for example, a natural or synthetic rubber, polytetrafluoroethylene, and an amount of molybdenum disulfide effective to provide a uniform mixing of the polytetrafluoroethylene and the elastomer. Such new compositions can comprise about 25–80 percent polytetrafluoroethylene, about 1–30 percent molybdenum disulfide, and the balance of an elastomer. Preferably, the new compositions include about 2 percent to about 6 percent of polytetrafluoroethylene that is fibrillatable and fibrillated in the composition. New compositions including about 2 percent to about 6 percent of such fibrillated PTFE, an effective amount of molybdenum disulfide, and an elastomer, such as natural or synthetic rubber, can provide compositions with exceptional durability and life without loss of their elastic and frictional characteristics, with a total polytetrafluoroethylene contents of up to about 12 percent.

The invention can improve many physical properties of elastomers and can be used to extend and strengthen more expensive elastomers, as a cured solid or a cured foam.

Compositions and products of the invention can also be provided with the advantages of many of the unique properties of polytetrafluoroethylene combined with the advantageous properties of elastomers. Among the properties of PTFE that may be realized in such compositions and products are chemical inertness and stability, insolubility, heat resistance, electrical insulation and surface lubricity and abrasion resistance; and these properties may be incorporated into an elastic article or product. The invention may be considered as permitting the advantages of the unique properties of elastomers to be combined with those of polytetrafluoroethylene, the most advantageous of such properties being elasticity and "memory," recovery from deformation.

The invention is particularly effective in increasing the life of products that are exposed to repeated flexure through the application of compression and tensile forces. Even small amounts, i.e., 2 percent to 6 percent, of fibrillated PTFE uniformly mixed in elastomer compositions can provide unexpected increases in durability and life. In such applications, elastomeric products particularly fail through the accumulative effects of heat generated within the products as a result of such recurrent forces; that is, such products frequently fatigue and fail through the heat loss represented by the hysteresis of their elastic deformation. It is believed that internally generated heat, probably the result of internal friction accompanying the flexure of the elastomeric material, effects a gradual change in the composition, particularly in its physical properties, and provides a progressive failure. With compositions of the invention, products subject to such fatigue failures can be manufactured with useful lives several times those of products manufactured with prior elastomeric compositions. Such products include automobile and aircraft tires, pads for the tracks in military tanks, shock absorbers, O-rings, and the like. Where lubricity is undesirable, such as in the manufacture of tires for automobiles, aircraft, and other vehicles, the total PTFE content of the composition is preferably less than about 12 percent. However, the invention also permits an elastic product having a lubricious surface and can provide particularly effective O-rings, bearing-seals and the like.

Furthermore, the invention permits the manufacture of an article formed from an elastomer having a first portion with first desirable physical properties and a second portion with second desirable physical properties. In such an article, the article body portion is formed from a cured elastomer composition to provide the body portion with the first desirable physical properties of the cured elastomer composition, and the second article portion is formed from the cured elastomer of the article body portion uniformly mixed with particulate polytetrafluoroethylene and particulate molybdenum disulfide and integrally joined with said body portion by cured elastomer.

In the manufacture of such composite articles with the invention, an elastomer is mixed to form a first elastomer composition to provide first physical properties desirable in the first portion of the product, and the elastomer is mixed to provide a second elastomer composition with second desired physical properties. In the invention, additives of the invention may be mixed with the elastomer to form either the first elastomer composition, or the second elastomer composition, or both the first and second elastomer compositions. Thus, a first elastomer composition can be mixed to provide the first physical properties desirable in the first portion of the product. The elastomer of the first elastomer composition can be mixed with an additive comprising particulate polytetrafluoroethylene and particulate molybdenum disulfide to form a second elastomer composition, the particulate molybdenum disulfide having a majority of particles with sizes substantially smaller than the majority of particles of particulate polytetrafluoroethylene and being in substantial part adherent to said polytetrafluoroethylene particles before addition to and mixing with the elastomer. The additive is selected to alter one or more physical properties of the elastomer to provide second physical properties that are desirable in a second portion of the product.

The first elastomer composition is formed for manufacture of the first portion of the product, and the second elastomer composition is formed for manufacture of the second portion of the product. The formed first elastomer portion of the product is placed together with the formed second portion of the product, and the first elastomer portion and the second elastomer portion of the product are cured together to form an integral elastomer product having a first portion with first physical properties and a second portion with second physical properties. Such products may be formed by the manufacturing processes commonly used in the manufacture of products from elastomers, including compression and injection molding, extrusion and the like. Such composite products can, for example, present a relatively hard, lubricious surface to meet the need for such properties in one portion of a product and provide a relatively soft, tear resistant elastomeric body.

This invention is also based on the discovery that the form of the particulate polytetrafluoroethylene can be of particular importance in improving elastomers, such as EPsyn 55 sold by Copolymer Rubber & Chemical Corporation and silicone rubber, having low tensile strengths and low moduli of elasticity, and particularly that small amounts of fibrillated PTFE, such as TEFLON K-10 sold by E. I. du Pont de Nemours and FLUON CD1 sold by ICI Americas, when mixed into such elastomers, can improve their tensile strength or their moduli of elasticity or both, particularly at high temperatures, both in the presence of PTFE in other forms and in the base elastomers. It has been discovered that fibrillated PTFE is so effective in such compositions that only a small weight percentage of about 4 percent (i.e., 2–6 percent) is necessary to achieve the substantial benefits of the component. Such small amounts of fibrillated PTFE can even significantly improve the tear strength and modulus of elastomers with high tensile strengths, such as nitrile rubber and butadiene acrylonitrile, and again this improvement in the modulus of elasticity continues at elevated temperatures. Products where such improved compositions are important include, for example, O-rings, lip seals for hydraulic and pneumatic cylinders, seals for pumps, valves, and other such hydraulic components.

It should be understood that reference to "fibrillated PTFE" in this and my prior applications means PTFE that is fibrillated in the body of my composition. Such "fibrillated PTFE" is manufactured as a coagulated dispersion polymer which may fibrillate under shear and is thus capable of fibrillation. As purchased, the fibrillated PTFE are coagulated dispersion polymer particles. FLUON CD1 manufactured by ICI Americas, Inc., is one such fibrillated PTFE. Such PTFE is preferably added to the mixer and fibrillated as it is mixed with the other components of the composition.

The invention permits a combination of the physical properties of elastomers and PTFE to obtain their desirable physical properties and permits the development of new products with strikingly improved durability and performance in many applications.

It has been discovered that the presence of effective amounts of molybdenum disulfide will permit the manufacture of such compositions with significant and effective combinations of polytetrafluoroethylene and elastomers. It is believed that the molybdenum disulfide permits elastomers to wet the extensive surface of particulate polytetrafluoroethylene and contributes to the fibrillation of fibrillated PTFE. It is believed that the presence of effective amounts of molybdenum disulfide permits the intimate dispersion and mechanical interaction of the elastomer and PTFE in percentages of polytetrafluoroethylene which can be greater than 25 percent by weight of the total composition.

It has also been discovered that effective amounts of molybdenum disulfide will permit the intimate mixing of solid components with elastomers with a reduced heat buildup and a reduced loss of elastomer scorch safety, not only with PTFE particulate matters but with other particulate matter, including granular, flaked and powdered fillers and fibrous materials such as cotton and rayon fibers. Compositions of this invention are thus the result of a method comprising mixing together an elastomer, such as natural or synthetic rubber, particulate material, preferably including PTFE powders capable of fibrillation, and an amount of molybdenum disulfide that is effective to uniformly incorporate the particulate material, and most particularly the fibrillated PTFE, in the elastomer material.

Effective amounts of molybdenum disulfide lie in the range from about 1 percent to about 30 percent by weight of the composition, and are determined by addition to the composition as it is being mixed. The amount of molybdenum disulfide which is effective appears to depend upon the quality and nature of the particulate material and the quantity of molybdenum disulfide. Where the molybdenum disulfide and PTFE are premixed as set forth below, the premixed PTFE-molybdenum disulfide additive preferably contains about one part by weight of molybdenum disulfide for each three parts by weight of PTFE, and in additives for injection-molded elastomers as little as one part of molybdenum disulfide for each six parts of PTFE. Where such preferred additives with one part of molybdenum disulfide for each three parts of PTFE do not seem to blend readily with the elastomer, additional molybdenum disulfide may be added as the composition is being made. In making such a composition with lower amounts of polytetrafluoroethylene, e.g., containing about 2–6 percent of fibrillated PTFE, the amount of molybdenum disulfide may be approximately equal to about 1.25 percent of the composition, and where the particulate PTFE in the composition is not in fibrillated form, about 0.75 percent of the composition; and where the composition contains higher amounts of polytetrafluoroethylene, e.g., about 35–40 percent of granular PTFE, the amount of molybdenum disulfide can be substantially reduced to the range of about 6.0 to about 10.0 percent of the composition.

All percentages in this application are given by weight of the total composition unless otherwise indicated; and throughout this application, all "parts" of compositions and additives are determined by weight and are based upon 100 parts of the base elastomer unless otherwise indicated. For example, compositions of the invention generally may contain about 1 part by weight to about 12 parts by weight of fibrillated PTFE per 100 parts by weight of the base elastomer and about 22 parts by weight to about 100 parts by weight of granular PTFE per 100 parts by weight of the base elastomer. As set forth herein, various combinations of fibrillated and granular PTFE additives can be advantageously used in the invention and can be combined with fillers, curing agents, and other ingredients.

A number of products may be molded from compositions resulting from such a method of manufacture and cured (or vulcanized) to provide an elastic solid product with improved physical properties as a result of the quantity of particulate material such as polytetrafluoroethylene incorporated into the composition of the product.

One product of this invention comprises an improvement for watercraft and a method for enhancing efficient movement through water, an outer hull covering for such watercraft comprising a layer made of a composition containing about 25-80 percent polytetrafluoroethylene, about 1-30 percent molybdenum disulfide, and the balance of an elastomeric material.

In its most preferred form, this covering layer and method were prepared as a substantially homogenous combination of about 50 percent reprocessed polytetrafluoroethylene powder, about 20 percent molybdenum disulfide, and the balance (about 30 percent) of ethylene-propylene terpolymer as the base elastomer. The composition was cured by standard procedures to form a layer having a preferred thickness of about one-half inch. The layer material was pressed, formed, and cut into patterned sheets which were later assembled to form a continuous, adherent covering on a metal substrate such as the outer hull or surface of a watercraft.

The preferred layer material provides a hard, durable, and resilient covering that requires little maintenance and provides improved sound insulation and ease of repair. It provides anti-fouling assistance and enhances speed and energy efficiency by substantially lowering the coefficient of friction of the outer surface and reducing drag due to water resistance to movement by the watercraft. Its uses are broad, including all types and sizes of watercraft and other structures from rowboats and surfboards to sailboats, ocean liners, tankers, conventional and atomic-powered submarines and other military vessels and to wharfs, docks, buoys, and the like. Other uses include as sound mountings for various types of equipment and as O-ring seals, valves, fittings, and many uses in the rubber industry. The substrate or surface to which applicant's covering layer adheres can be metal, natural or synthetic rubber, plastic, fiberglass, concrete, wood or other material.

Related objects and advantages of the present invention will be apparent from the following more detailed description.

Brief Description of the Drawings

FIG. 1 is an example of a composite article of the invention having portions with different physical characteristics;

FIG. 2 is a cross-sectional view of the exemplary composite article of FIG. 1 taken along lines 2—2;

FIG. 3 illustrates the operation of the exemplary composite article of FIGS. 1 and 2; and FIGS. 4A and 4B illustrate elements from which a composite article such as that shown in FIGS. 1 and 2 may be made.

Description of the Preferred Embodiments

For purposes of promoting an understanding of the principles of the invention, reference will now be made to the preferred embodiments; and specific language will be used to describe the same. It will nevertheless be understood that no limitation of the scope of the invention is thereby intended, such alterations and further modifications of such embodiments, and such further applications of the principles of the invention being contemplated as would normally occur to one skilled in the art to which the invention relates.

The invention permits the modifications of the physical properties of elastomeric materials and elastomers, particularly rubber and synthetic rubber, and in some applications, such as an outer hull covering, as a result loading in a base elastomeric material at least about 25 percent polytetrafluoroethylene and an effective amount of molybdenum disulfide. In another sense, with high PTFE percentages, the invention can be considered as lending the elasticity and memory of elastomeric materials to a material with polytetrafluoroethylene properties.

In a preferred form, the composition of the invention contains about 25-80 percent polytetrafluoroethylene, about 1-30 percent molybdenum disulfide, and the balance of an elastomeric material; a still more preferred composition range for the components of this invention is about 25-50 percent polytetrafluoroethylene, about 3-20 percent molybdenum disulfide, and the balance of elastomeric material. A preferred composition for exposure to sea water contains 50 percent polytetrafluoroethylene, about 20 percent molybdenum disulfide, and the remaining about 30 percent of a base elastomer comprising ethylene-propylene terpolymer resin. In other forms of the invention, a portion of an elastomer composition, preferably no more than about 10 percent, of the PTFE may be fibrillated PTFE.

Ethylene-propylene terpolymer resin is a synthetic rubber and is known for its versatility and resistance to long-term water immersion, and particularly for its resistance to degradation by sea water. It is readily vulcanized, using, for example, a sulfur and peroxide curing agent and has been used in the past for such things as automotive parts, cable coatings, hoses, footwear, and other products. A specific ethylenepropylene terpolymer compound usable in such compositions is a NORDEL brand marketed by E. I. du Pont de Nemours Co., Inc. Such a composition is particularly preferred for use in sea water and in such applications as outer hull coverings for watercraft.

Other elastomers work as a base material, particularly with other applications. For example, natural rubber works as an effective base material for use in fresh water.

Polytetrafluoroethylene may be that commonly known by the federally registered trademark TEFLON which is the name for compounds marketed by E. I. du Pont de Nemours Co., Inc.; FLUON which is the name for compounds marketed by ICI Americas; and WHITCON 2 which is the name of a particulate powder marketed by ICI Americas. Such materials are recognized for heat resistance and friction-reduction as when used, for example, on the surfaces of kitchen utensils and for other mechanical applications. Such materials are available in various forms. A more common form of particulate PTFE is manufactured by grinding or fracturing larger PTFE particles into powdered particulate PTFE. A base elastomer can be, for example, loaded with a reprocessed polytetrafluoroethylene in the form of a cryogenically ground powder. TL-115A is a specifically usable compound and is a trademark designation for the compound manufactured by LNP Division of ICI Americas, Wilmington, Delaware. TL-115A is known for its bearing characteristics as an additive in thermoplastic and thermoset polymeric systems. It has an irregular particle shape ranging in size from about 2 to 45 microns, although particles substantially larger in size up to at least about 75 to 100 microns work in applicant's invention without appreciably affecting surface texture or drag coefficient; for example, in the hull coverings for watercraft. As previously stated, the amount of polytetrafluoroethylene loading in a preferred composition varies from the broad range of at least about 25 percent to an amount of about 50 percent which is presently most preferred as a covering layer for use in sea water. One characteristic of this most preferred composition is its hardness of about 80–90 durometer which is beneficial not only for durability, but also for drag coefficient and sound attenuation properties.

The third component of the composition of this invention is molybdenum disulfide in the preferred ranges previously specified. The preferred molybdenum disulfide is technical grade powder. Such molybdenum disulfide powder may be that sold by Amax, Inc., as its technical grade. Such powdered molybdenum disulfide generally has, in technical grade, about 85 percent of its particles smaller than 44 microns, may be provided with small average of particle sizes (e.g., less than ten microns), and is characterized by substantial purity with over 98 percent comprising molybdenum disulfide and less than two percent comprising such materials as insoluble acids, minerals, carbon, water, and oil. Molybdenum disulfide withstands pressures exceeding 500,000 psi and is serviceable through temperatures of $-375°$ F. to $750°$ F. The powdered molybdenum disulfide is added to the base elastomer and the polytetrafluoroethylene components to arrive at the final composition. Amounts of molybdenum disulfide in excess of amounts effective to uniformly incorporate PTFE into elastomers can be used to improve the ease of incorporation of PTFE into the elastomer and the lubricity of a resulting composition. Of course, alternate embodiments can include fillers such as conventional pigments and others; and the same are within the scope and contemplation of applicant's invention as disclosed and claimed herein.

The method of preparing one preferred composition is first to combine the various dry ingredients to arrive at a substantially homogeneous combination. A curing agent is added, and the mixture is placed in a reaction vessel appropriate for vulcanizing resins of this type. The component is cured, i.e., vulcanized, using standard procedures by applying heat and pressure for a specified period of time. A standard 24"×24" O-ring press can be used to cure the compound in the shape of a flattened layer or sheet. In commercial use, the material can be calendered or otherwise pressed and cured into appropriately sized sheet stock from which modular panels can be cut or otherwise shaped.

In making such compositions with fibrillated PTFE, the fibrillated PTFE, such as ICI Americas's FLUON CD1, or du Pont's TEFLON K-10, is preferably added to the mixer (e.g., a Banbury mill) as purchased, that is, in particulate form. In mixing of the composition, this PTFE component of the composition is fibrillated uniformly in the composition; and it lends surprising durability to the composition and strengthens many elastomer components that are made from such compositions.

The fibrillatable PTFE preferred for use in the invention is a coagulated dispersion polymer such as FLUON CD1 made by ICI Americas. I have discovered, however, that the temperature and time used in processing the completed coagulated dispersion to dry the dispersion must be controlled. In the past, such coagulated dispersions have been exposed at high temperatures in drying the particulate resin material. The fibrillatable PTFE preferably used in my invention should be exposed to lower temperatures in drying the particulate resin material to obtain fibrillatable PTFE particles capable of fibrillation to achieve very high length-to-diameter ratios. In determining preferred coagulated dispersions, I have found that preferred coagulated dispersons can be extruded through a small orifice (e.g., orifice with a cross section of about $\frac{1}{4}$ inch or less) by a hydraulic ram with pressures of only about 12,000 psi., while non-preferred resins require markedly higher ram pressures of, for example, 15,000 psi.

The particulate polytetrafluoroethylene and molybdenum disulfide make highly desirable and novel additives for elastomer compositions. In preparing such additives, particulate polytetrafluoroethylene and particulate molybdenum disulfide are preferably placed together in a mixing apparatus, such as a rotating mixing barrel, and intermixed together. Preferably, the particle size of the molybdenum disulfide particles is generally many times smaller than the particle size of the fibrillatable polytetrafluoroethylene. Fibrillatable polytetrafluoroethylene can have median particle sizes as large as 450 to 600 microns although average particle sizes substantially smaller than 450 to 600 can be used. Granular polytetrafluoroethylene preferably has a majority of its particles with a particle size in the range of about 2 to 45 microns and, more preferably, in the range from 10 to 20 microns. The molybdenum disulfides used in the invention preferably are technical grade and have a substantial majority of particles with sizes less than about 45 microns, with average particle sizes of about four microns and less. Where the average particle size of the polytetrafluoroethylene lies in the range of about 2 to 45 microns, the average particle size of the molybdenum disulfide should be substantially smaller than that of the particulate polytetrafluoroethylene, e.g., about one-third to one-tenth, or less. Where the polytetrafluoroethylene is fibrillatable, the average particle size of the molybdenum disulfide can be one-twentieth that of the fibrillatable polytetrafluoroethylene and smaller. The particulate matter is mixed together for a sufficient time that the molybdenum disulfide particles are generally adherent to the polytetrafluoroethylene particles, and the mixture particles become uniformly grey-black in appearance. As an example, 150 pounds of additive material was obtained with fifteen minutes of agitation and mixing. The adherence of the molybdenum disulfide particles to the particulate polytetrafluoroethylene is believed to be enhanced by an electrostatic charge differential that may be developed between the polytetrafluoroethylene particles and the molybdenum disulfide particles while they are being mixed together.

In order to permit better formulation and mixing of many varied elastomer compositions and more effective use of the additives, it is preferred to produce two additives: one with fibrillatable polytetrafluoroethylene and one with particulate, or granular, polytetrafluoroethylene. In preparing the additives with fibrillatable polytetrafluoroethylene, preferably about one-third part by weight of particulate molybdenum disulfide per part of fibrillatable polytetrafluoroethylene is mixed with one part by weight of fibrillatable polytetrafluoroethylene. In preparing the additives with granular polytetrafluoroethylene, preferably about one-third part of molybdenum disulfide per part by weight of granular polytetrafluoroethylene by weight is mixed with one part by weight of granular polytetrafluoroethylene for use in many applications. Of course, additives can be made with other ratios of molybdenum disulfide to PTFE. In additives for elastomer compositions to be used in injection molding, only one-sixth part by weight of molybdenum disulfide per part of PTFE may be preferred.

The resulting additives thus preferably contain polytetrafluoroethylene particles with adherent particles of molybdenum disulfide. Where the PTFE particles are of a size larger than 10 to 20 micron average particle size, the PTFE particles are preferably coated with many molybdenum disulfide particles. It is believed that technical grade molybdenum disulfide with particles having an average particle size on the order of one micron and smaller will be particularly advantageous where the particulate polytetrafluoroethylene includes particles at the lower end of the 2 to 45 micron range.

The use of such polytetrafluoroethylenemolybdenum disulfide additives is preferred in making the compositions of this invention. The prior association of molybdenum disulfide particles with polytetrafluoroethylene particles greatly assists the uniform mixing of the particulate polytetrafluoroethylene into the elastomer, particularly where the elastomer composition includes fibrillated polytetrafluoroethylene, which is more difficult to mix into the elastomer. The molybdenum disulfide associated with the surface of the polytetrafluoroethylene particles is believed to enhance the entry of the polytetrafluoroethylene particles into the elastomer and deter adherent association of the polytetrafluoroethylene particles with themselves. Furthermore, it is believed that the coating of molybdenum disulfide particles on the fibrillatable polytetrafluoroethylene particles interacts with the surrounding elastomer upon mixing and assists in the fibrillation of the polytetrafluoroethylene.

The preferred use of the invention involves the addition of one or both of two premixed additives. One additive comprises fibrillatable PTFE, preferably FLUON CD1 of ICI Americas, Inc., which is soft as a result of lower temperature drying of the PTFE particles during manufacture and capable of extrusion through a small orifice by a hydraulic ram at pressures of 12,000 psi. or less, and a technical grade molybdenum disulfide powder, such as that sold by Amax, Inc., and Cyprus Industrial Minerals Company, generally adherent to the fibrillatable PTFE particles. The other additive comprises granular PTFE, such as TL 115A sold by the LNP Division of ICI Americas or L 169 of ICI PLC, having particle sizes in the range of 20 to 45 microns and technical grade molybdenum disulfide powder, generally adherent to the granular PTFE particles.

The fibrillatable additives are generally preferred in millable elastomers such as fluorocarbons, fluorosilicone rubber, and silicone elastomers. The fibrillation of the fibrillatable additive generally raises the temperature of the "green" elastomers; and it is, therefore, preferable to add accelerators, curing agents, and other fillers after the fibrillatable additive has been mixed into the base elastomer. The adherent molybdenum disulfide particulates on the fibrillatable PTFE particles assist the fibrillation and uniform incorporation of the PTFE into the base elastomer. As indicated above, only about two to six percent (2%-6%) addition by weight provides the benefit of the fibrillatable additive, although in some cases up to about ten percent (10%) and in other cases as little as about one percent (1%) by weight may be used. Because the fibrillated PTFE additive increases the green strength of the elastomer mix, it is preferably added to the mix in small amounts during preparation of test batches to permit an assessment of its effect during processing. In production, the requisite amount of additive may normally be added to the mix first and at one time.

The granular PTFE additives are generally preferred in millable elastomers that will benefit from improved surface lubricity and wear in applications where abrasion is a problem or surface lubricity and hardness are desired. The use of granular PTFE additives is particularly beneficial in combination with the fibrillatable additive because the fibrillatable additive provides a fibrillated PTFE matrix within the base elastomer to support high percentages of granular PTFE in the base elastomer. The adherent molybdenum disulfide particles on the granular PTFE assists the uniform incorporation of percentages as high as fifty percent (50%) or more by weight into elastomers to provide products manufactured therefrom with low friction surfaces, increased abrasion resistance, and reduced heat rise from hysteresis.

Both additives can frequently improve the durability of many products at temperatures substantially above room temperature such as 300° F. (150° C.) or more.

Use of additives of this invention can also substantially reduce the cost of products made from expensive elastomers such as fluorocarbon and fluorosilicone elastomers while improving their manufacturability, for example, by improving their hot tear strength as well as their durability in service. In addition, additives of this invention can frequently reduce curing times and temperatures of products including the additives. Desirably, additives of the invention are kept as free of moisture as possible and in elastomers sensitive to moisture, such as fluorocarbon elastomers, may be used with small amounts of calcium oxide.

In the generally preferred procedure for preparing elastomer compositions of this invention with elastomers such as fluoroelastomers, natural rubber buna N, SBR, EPDM, and the like, the elastomer composition and carbon black, where added, are first mixed, for example, on a Banbury mixer. The additive with fibrillated polytetrafluoroethylene is then added on the mixer and mixing continues until the temperature of the blend begins to rise sharply. The additive with granular polytetrafluoroethylene, where used, is then added to the mixer; and mixing continues until the temperature, rheology and appearance indicate that a uniform mixture has been achieved. It is sometimes desirable to "sweeten" the mixture by the addition of molybdenum disulfide. The fibrillated polytetrafluoroethylene is best uniformly mixed and fibrillated in the composition by this procedure, where it is added to the elastomer first on the mixer and before any curing agents or other fillers are added. The mixed composition is then sheeted by running it through a mill in several passes, turning ninety degrees between each pass as commonly practiced in the art. The sheeted mixture should have a uniform corrugated surface appearance and should show only a dull finish.

The sheeted mixture is then chopped for a second pass through the mixer and the addition of curing agents and all other fillers. After the curing agents and other fillers are uniformly mixed into the elastomer-polytetrafluoroethylene composition, the entire composition is milled, sheeted, and cooled in a manner common to elastomer preparation and is ready to use.

Where elastomers, like silicone, with no integrity in the base elastomer, are formulated with this invention, mixing of the fibrillated polytetrafluoroethylene additive is preferably first accomplished on an open mill. Such base elastomers are given integrity by the fibrillated polytetrafluoroethylene and the initial mixing continues on the mill until the elastomer begins to sheet properly. Further processing of such elastomer compositions can then continue as with other processible elastomers. It is possible, however, that sufficient integrity may be obtained that mixing of the elastomer composition may be accomplished on an internal mixer. As set forth above, to avoid loss of scortch resistance, any curing agents should be added after complete fibrillation and dispersion of the particulate polytetrafluoroethylene.

Compositions of this invention, made with additives and methods of this invention, and their advantages are believed to be derived in part from the matrix-like structure including an intimate, mechanical, interengagement of elastomer with particulate polytetrafluoroethylene and molybdenum disulfide and, where fibrillated polytetrafluoroethylene is incorporated, in web-like structures of polytetrafluoroethylene within the matrix. It is believed that throughout processing, the particles of molybdenum disulfide remain adherent to the fibrillatable PTFE as it is fibrillated, thus providing an effective interface between the fibrillatable PTFE and the elastomer that is believed to assist in the fibrillation of the polytetrafluoroethylene and in the adherence between the fibrillated polytetrafluoroethylene and the elastomer in the resulting compositions. It is likewise believed the adherence of molybdenum disulfide particles on the granular polytetrafluoroethylene assists in its uniform dispersion throughout the elastomer during mixing and adherence between the polytetrafluoroethylene particles and elastomer in the resulting compositions.

It is also possible to mix polytetrafluoroethylene-molybdenum disulfide additives with base elastomers that are in emulsion form. The additives can be uniformly mixed with the fluid elastomer emulsion; and where fibrillated polytetrafluoroethylene particles are used, they can be fibrillated later during manufacture of elastomer compositions.

For the purpose of promoting a better understanding of the invention, the following examples are given of specific compositions of the invention and their methods of preparation.

Example 1

A 100 g amount of applicant's composition was compounded by combining 50 percent by weight TL-115A polytetrafluoroethylene powder with 20 percent by weight molybdenum disulfide crystals and with 30 percent by weight NORDEL ethylene-propylene terpolymer resin in a container. The dried ingredients were thoroughly blended to arrive at a substantially homogeneous mixture, and a standard peroxide curing agent was added. The compound was placed in an O-ring press having a 24-inch square bed and was heated for ten minutes at 350° F. The resulting vulcanized sheet material was dark grey in color, was 0.1 inch thick and tested at a hardness level of 85-90 durometer.

Example 2

A 100 g amount of applicant's composition was compounded by combining 25 percent by weight TL-115A polytetrafluoroethylene powder with three percent by weight molybdenum disulfide and 72 percent by weight NORDEL ethylene-propylene terpolymer resin. The ingredients were blended and cured as in Example 1. Several ring-shaped pieces were molded from this material and were found to work effectively as O-rings in various mechanical applications.

Examples 3, 4, 5, 6, 7, 8

The effect of inclusion of the invention in ethylene propylene terpolymer elastomers, such as Copolymer Rubber & Chemical Corporation's EPsyn R 55, can be observed from the following examples and tests. Composition samples were prepared with 100 parts of the base elastomer mixture which included 100 parts of a composition sold by Copolymer Rubber & Chemical Corporation under its registered trademark EPsyn 55 and other standard ingredients of such elastomer compositions. Example 3 sets forth the test of this composition for comparison with the invention. In the composition of Example 4, 50 parts of particulate PTFE, such as WHITCON 2 of ICI Americas, was added to the basic elastomer mixture of Example 3 with an effective amount of molybdenum disulfide. In Example 5, 100 parts of WHITCON 2 were added to the basic elastomer mixture of Example 3 with an effective amount of molybdenum disulfide. In Example 6, four parts of fibrillated PTFE, such as FLUON CD1 sold by ICI Americas, was added to the basic elastomer mixture of Example 3 with an effective amount of molybdenum disulfide. In Example 7, 46 additional parts of particulate PTFE, such as WHITCON 2, were added to the mixture of Example 6 with an effective amount of molybdenum disulfide to make a total of 50 parts of PTFE in the composition. In Example 8, 96 additional parts of WHITCON 2 were added to the composition of Example 6 with an effective amount of molybdenum disulfide to provide a total of parts of PTFE in the composition. The physical properties, tensile strength, elongation, modulus, and hardness of the compositions of Examples 3-8 are presented in the table below.

|  | | EXAMPLE | | | | | |
| --- | --- | --- | --- | --- | --- | --- | --- |
|  | | 3 | 4 | 5 | 6 | 7 | 8 |
| Rheograph Properties Model 100 320° F. 30 Minute Motor | | | | | | | |
| Min. Torque, in.-lbs. | | 9.1 | 9.5 | 10.7 | 9.7 | 11.0 | 12.0 |
| Max. Torque, in.-lbs. | | 60.0 | 59.5 | 60.8 | 89.2 | 88.5 | 89.4 |
| $T_{2'}$ minutes | | 3.0 | 3.1 | 3.2 | 3.0 | 2.8 | 2.7 |
| $T_{90'}$ minutes | | 17.8 | 14.5 | 13.2 | 19.0 | 16.7 | 16.7 |
|  | Press Cure 320° F. | | | | | | |
| Tensile, psi | | | | | | | |
| @ RT | 15' | 725 | 1075 | 900 | 1075 | 1025 | 875 |
| @ 300° F. | 15' | 350 | 425 | 400 | 500 | 475 | 450 |
| Elongation, % | | | | | | | |
| @ RT | | 220 | 470 | 410 | 380 | 400 | 370 |
| @ 300° F. | | 110 | 160 | 140 | 110 | 150 | 150 |
| 100% Modulus, psi | | | | | | | |
| @ RT | | 475 | 325 | 325 | 500 | 475 | 450 |
| @ 300° F. | | 325 | 350 | 350 | 475 | 425 | 400 |
| Hardness, Shore A | | | | | | | |
| @ RT | | 67 | 69 | 69 | 70 | 71 | 75 |

As can be determined from comparison of this data, the tensile strength at room temperature and at 300° F. of the composition of Examples 4–8 are substantially improved compared with the basic elastomer mixture of Example 3. Furthermore, the inclusion of only four parts of fibrillated PTFE in such compositions will provide them with tensile strength at room temperature and at 300° F. which is substantially better than the basic elastomer mixture, and the improvement in tensile strengths of the compositions with fibrillated PTFE are particularly significant at elevated temperatures such as 300° F. In addition to the significant improvement in the tensile strengths of such elastomer mixtures, the inclusion of four parts of fibrillated PTFE in the compositions of Examples 6–8 substantially improve the modulus level elasticity of the composition, both at room temperature and at 300° F. Elongation of the compositions of Examples 4–8 is also substantially improved.

Examples 9, 10A, 10B, 11, 12A, and 12B

The effects of the invention in silicone elastomer compositions are shown in comparisons of Example 9 with Examples 10A and 10B and Example 11 with Examples 12A and 12B and the results of their testing. Example 9 is one silicone rubber composition including its additives, and Example 11 is another and different silicone rubber composition including its additives.

Examples 10A and 10B demonstrate the invention with the addition of a single fibrillatable PTFE additive of this invention. Example 10A includes the silicone rubber composition of Example 9 with 1 part by weight of fibrillatable PTFE additive, including an effective amount of molybdenum disulfide, per 100 parts by weight of the silicone rubber composition. Example 10B includes the silicone rubber composition of Example 9 with 2 parts by weight of the fibrillatable PTFE additive of Example 10A, including an effective amount of molybdenum disulfide, per 100 parts by weight of the silicone rubber composition.

Examples 12A and 12B demonstrate the invention with the addition of one and two additives of this invention. Example 12A includes the second silicone rubber composition of Example 11 with 6 parts by weight of fibrillatable PTFE additive, including an effective amount of molybdenum disulfide, per 100 parts by weight of the second silicone rubber composition. Example 12B is the composition of Example 12A with an additional 25 parts by weight of granular PTFE additive, including an effective amount of molybdenum disulfide, per 100 parts by weight of the base second silicone rubber composition.

The physical properties of the compositions of Examples 9, 10A, 10B, 11, 12A, and 12B are presented below.

|  | EXAMPLE | | | | | |
| --- | --- | --- | --- | --- | --- | --- |
|  | 9 | 10A | 10B | 11 | 12A | 12B |
| Tensile, psi @ RT | 400 | 1500 | 1560 | 706 | 709 | 615 |
| Elongation, % | 1000 | 760 | 680 | 290 | 310 | 280 |
| 200% Modulus, psi @ RT | — | — | — | 424 | 509 | 528 |
| Die C Tear, pli | 120 | 290 | 280 | 43 | 78 | 89 |
| Durometer | 30 | 49 | 48 | 56 | 70 | 69 |

These compositions demonstrated chemical inertness, stability, heat resistance, surface lubricity, and abrasion resistance. Silicone elastomer compositions of this invention can be formulated having tensile strengths and tear strengths many times greater than the original elastomer. Such elastomers can provide tensile strengths and tear strengths that are two to three times greater than that of the silicone elastomer itself without loss of the chemical inertness, stability, heat resistance, and electrical insulating properties of the silicone elastomer, and with improved abrasion resistance.

Silicone compositions of the invention can provide substantially improved electrical insulation, particularly in applications such as insulation for spark plug wires. In such applications, the improved silicone elastomer of this invention surrounds in a generally concentric fashion the conductor carrying the high voltage necessary to produce a spark in the spark plugs of an automobile. The spark plug wires must operate adjacent to the engine block of the automobile, which now runs much hotter because of the emission limitation and gasoline efficiency requirements of the U.S., and must insulate the high voltage conductor from the engine parts. The electrical conductivity of electrical insulating materials, in most cases, increases substantially with temperature, and this is generally true of electrically insulating elastomers. Because of the higher temperatures at which automobile engines now operate, many elastomers previously used as insulation for spark plug wires are no longer reliable insulators in that application; and silicone elastomers, which are generally more expensive than the prior elastomers in use, are used because of their more reliable electrical insulating properties at higher temperatures. Silicone spark plug wire insulation is, however, subject to mechanical failure due to pulling, tearing, and abrasion because of its generally poor physical properties. With this invention, the physical properties of the silicone elastomer can be substantially improved in this application. Siliconepolytetrafluoroethylene elastomers of this invention can double or triple the tensile strength, tear strength, and abrasion resistance of silicone elastomer spark plug wire insulation, with no significant loss in heat resistance or electrical insulating properties, and can substantially extend the reliability and, it is believed, the life of silicone elastomer electrical insulation.

The improved silicone elastomer compositions of this invention have extended applicability to products in which substantially more expensive elastomers are now used because of the unique properties of the silicone elastomer and polytetrafluoroethylene and may permit a substantial reduction in the cost of such products. In addition, the invention can provide similar improvements in other electrically insulating elastomers because of the heat resistance, chemical inertness, and electrical insulating properties of the polytetrafluoroethylene. Elastomers of this invention can provide excellent cable and wire insulation and coverings. In addition to the aforementioned properties, the invention can provide a flexible and tough cable or wire insulation and cable covering with improved surface lubricity which will permit a cable to be pulled through conduit with greater ease and reliability. With the invention, elastomers less expensive than silicone elastomers may once again be usable for automotive spark plug wire insulation.

Examples 13, 14, 15, 16, 17, and 18

Examples 13-18 permit a comparison of the effect of the invention in nitrile rubber compositions, such as Copolymer Rubber & Chemical Corporation's COPO 1500. Example 13 is a standard nitrile rubber mixture including 100 parts of nitrile rubber. Example 14 is the nitrile rubber mixture of Example 13 with 50 parts of a particulate PTFE such as WHITCON 2 and an effective amount of molybdenum disulfide. Example 15 is the nitrile rubber mixture of Example 13 with 100 parts of particulate PTFE such as WHITCON 2 and an effective amount of molybdenum disulfide. Example 16 is the nitrile rubber mixture of Example 13 with four parts of a fibrillated PTFE such as FLUON CD1 and an effective amount of molybdenum disulfide. Example 17 is the nitrile rubber-fibrillated PTFE mixture of Example 16 with an additional 46 parts of particulate PTFE such as WHITCON 2 and an effective amount of molybdenum disulfide. Example 18 is the nitrile rubber-fibrillated PTFE mixture of Example 16 with an additional 96 parts of PTFE such as WHITCON 2 and an effective amount of molybdenum disulfide. The physical properties of the compositions of Examples 13-18 are compared in the table below.

|  |  | EXAMPLE | | | | | |
| --- | --- | --- | --- | --- | --- | --- | --- |
|  |  | 13 | 14 | 15 | 16 | 17 | 18 |
| Rheograph Properties Model 100 320° F. 30 Minute Motor |  |  |  |  |  |  |  |
| Min. Torque, in.-lbs. |  | 9.8 | 10.1 | 10.4 | 10.3 | 11.0 | 11.7 |
| Max. Torque, in.-lbs. |  | 48.9 | 47.6 | 45.7 | 50.0 | 49.0 | 46.9 |
| $T_{2'}$ minutes |  | 3.5 | 3.9 | 4.1 | 3.9 | 3.9 | 3.8 |
| $T_{90'}$ minutes |  | 11.7 | 12.3 | 13.8 | 13.9 | 14.2 | 16.4 |
|  | Press Cure 320° F. |  |  |  |  |  |  |
| Tensile, psi |  |  |  |  |  |  |  |
| @ RT | 12' | 3275 | 2650 | 2050 | 3000 | 2350 | 1900 |
| @ 300° F. | 12' | 1000 | 675 | 550 | 850 | 875 | 575 |
| Elongation, % |  |  |  |  |  |  |  |
| @ RT |  | 540 | 530 | 470 | 500 | 460 | 420 |
| @ 300° F. |  | 490 | 380 | 360 | 330 | 370 | 330 |
| 300% Modulus, psi |  |  |  |  |  |  |  |
| @ RT |  | 1500 | 1275 | 1125 | 1800 | 1550 | 1350 |
| @ 300° F. |  | 575 | 525 | 475 | 800 | 725 | 525 |
| Hardness, Shore A |  |  |  |  |  |  |  |
| @ RT |  | 66 | 69 | 70 | 68 | 69 | 74 |

Comparisons of the composition properties demonstrate the increased modulus of elasticity that is obtained with the addition of only four parts of fibrillated PTFE in nitrile rubber compositions of the invention.

Examples 19, 20, 21, 22, 23, and 24

Examples 19-24 permit a comparison of the effect of the invention in butadiene acrylonitrile elastomers. Example 19 is an elastomer mixture including 100 parts of butadiene acrylonitrile elastomer. Example 20 is the butadiene acrylonitrile elastomer mixture of Example 19 with 50 parts of particulate PTFE such as WHITCON 2 and an effective amount of molybdenum disulfide. Example 21 is the butadiene acrylonitrile mixture of Example 19 with 100 parts of particulate PTFE such as WHITCON 2 and an effective amount of molybdenum disulfide. Example 22 is the butadiene acrylonitrile mixture of Example 19 with four parts of fibrillated PTFE such as FLUON CD1 and an effective amount of molybdenum disulfide. Example 23 is the butadiene acrylonitrile elastomer-fibrillated PTFE mixture of Example 22 with an additional 46 parts of particulate PTFE such as WHITCON 2 and an effective amount of molybdenum disulfide. Example 24 is butadiene acrylonitrile elastomer-fibrillated PTFE mixture of Example 22 with an additional 96 parts of particulate PTFE such as WHITCON 2 and an effective amount of molybdenum disulfide. The compositions of Examples 19–24 are compared below.

|  |  | EXAMPLE | | | | | |
|---|---|---|---|---|---|---|---|
|  |  | 19 | 20 | 21 | 22 | 23 | 24 |
| Rheograph Properties Model 100 320° F. 30 Minute Motor | | | | | | | |
| Min. Torque, in.-lbs. | | 5.1 | 4.0 | 4.8 | 5.1 | 4.9 | 5.4 |
| Max. Torque, in.-lbs. | | 29.8 | 23.3 | 23.6 | 31.2 | 26.8 | 24.8 |
| T$_{2'}$ minutes | | 5.8 | 6.0 | 6.1 | 4.6 | 4.3 | 4.2 |
| T$_{90'}$ minutes | | 9.8 | 10.5 | 9.4 | 9.3 | 8.7 | 7.7 |
|  | Press Cure 320° F. | | | | | | |
| Tensile, psi | | | | | | | |
| @ RT | 10' | 3800 | 2475 | 1825 | 3250 | 2275 | 1575 |
| @ 300° F. | 10' | 525 | 425 | 425 | 675 | 525 | 425 |
| Elongation, % | | | | | | | |
| @ RT | | 690 | 640 | 580 | 620 | 560 | 500 |
| @ 300° F. | | 320 | 340 | 360 | 280 | 280 | 270 |
| 200% Modulus, psi | | | | | | | |
| @ RT | | 450 | 350 | 325 | 825 | 700 | 600 |
| @ 300° F. | | 300 | 250 | 225 | 525 | 400 | 325 |
| Hardness, Shore A | | | | | | | |
| @ RT | | 61 | 65 | 66 | 66 | 66 | 70 |

With the butadiene acrylonitrile rubber mixture as with the nitrile rubber mixture, the incorporation of as little as four parts of fibrillated PTFE in the composition imparts significant improvement in the modulus of elasticity both at room temperature and at elevated temperatures such as 300° F. In addition, the incorporation of four parts of fibrillated PTFE improves the tensile strength of such compositions at elevated temperatures such as 300° F.

Example 25

A composition was made with 100 parts of EPsyn 4506 (a trademark of Copolymer Rubber & Chemical Corporation), 45 parts of TL 115A polytetrafluoroethylene powder, 50 parts of technical grade molybdenum disulfide particles, 30 parts of HiSil 233, 1 part of TEA, 12 parts of Saret 500 and 5 parts of Varox. The ingredients were mixed together and cured and formed into test samples and tested in accordance with ASTM standards.

The composition demonstrated a Compound ML 1+4 at 212° F. of 94, and a Mooney Scorch, at 270° F., of 9.4 minutes for a 5 point rise and a minimum reading of 54. After pressing and curing at 320° F., a tensile strength of 1400 psi, an elongation of 230 percent, a 100 percent modulus of 750 psi, a 200 percent modulus of 1250 psi and a hardness Shore A of 81 were obtained at room temperature.

Example 26

A composition was made with 100 parts of EPsyn 4506 (a trademark of the Copolymer Rubber & Chemical Corporation), 40 parts of TL-115A, 7.5 parts of TEFLON K-10, 30 parts of technical grade molybdenum disulfide, 40 parts of HiSil 233, 15 parts of Saret 500, 9 parts of Dicup 40KE, 5 parts of FEF Block, and 1 part of TEA. The ingredients were mixed together and cured and formed into test samples and tested in accordance with ASTM standards.

The composition demonstrated a Compound ML 1+4 at 212° F. of 108 and a Mooney Scorch, at 270° F., of 3.8 minutes for a 5 point rise and a minimum reading of 48. After pressing and curing at 320° F., a tensile strength of 2050 psi, an elongation of 150 percent, a 100 percent modulus of 1625 psi, and a hardness Shore A of 91 were obtained at room temperature.

Examples 27, 28, 29, 30, 31, 32, 33, and 34

Compositions according to the invention were made and tested with four base elastomers including Viton, an elastomer manufactured and sold by E. I. du Pont de Nemours Company under that trademark, Nitrile, Acrylic, and EPDM elastomers. Each of the base elastomer compositions of Examples 27, 29, 31, and 33 included elastomer and carbon black, curing agents, fillers, oxidants, and the like which the manufacturer believed advisable to lend desirable physical properties to the elastomer composition after it was cured. In Examples 28, 30, 32, and 34, respectively, particulate polytetrafluoroethylene and molybdenum disulfide were added to the elastomer of Examples 27, 29, 31, and 33 in such amount that the particulate polytetrafluoroethylene and molybdenum disulfide formed about 30 percent of the combined weight of the elastomer, carbon black, particulate PTFE and MOS$_2$ components (i.e., the elastomer and carbon black comprised about 70 percent by weight of the combination, excluding curing agents, filler, oxidants, etc.). Each of these compositions included about 6 percent by weight of fibrillated polytetrafluoroethylene and about 18 percent of particulate polytetrafluoroethylene to comprise approximately 24 percent total of polytetrafluoroethylene in the composition.

The physical properties of the base elastomer compositions are compared with the physical properties of the elastomer compositions of the invention below.

| Physical Properties | EXAMPLE | | | |
|---|---|---|---|---|
| | 27 | 28 | 29 | 30 |
| | ACRYLIC | | EPDM | |
| Tensile | 960 | 930 | 1770 | 1740 |
| 50% Modulus | 545 | 891 | 816 | 1255 |
| 100% Modulus | 680 | 923 | 1290 | 1460 |
| Elongation | 237 | 170 | 156 | 185 |
| Durometer | 78 | 82 | 79 | 86 |
| Die C Tear | 87.3 | 170.3 | 143.3 | 231.2 |
| Specific Gravity | 1.39 | 1.48 | 1.35 | 1.44 |
| Compression Set | 22/300 81.3 | 22/300 81.1 | 70/300 66.1 | 70/300 58.7 |
| Tabor Abrasion (milligrams lost) | 683 | 332 | 600 | 176 |

| Physical Properties | EXAMPLE | | | |
|---|---|---|---|---|
| | 31 | 32 | 33 | 34 |
| | NITRILE | | VITON | |
| Tensile | 1420 | 1576 | 1608 | 2000 |
| 50% Modulus | 845 | 1103 | 483 | 1541 |
| 100% Modulus | 1290 | 1440 | 858 | 1791 |
| Elongation | 280 | 220 | 216 | 173 |
| Durometer | 80 | 84 | 80 | 87 |
| Die C Tear | 204.1 | 249.9 | 115.7 | 266.0 |
| Specific Gravity | 1.39 | 1.44 | 1.97 | 2.02 |
| Compression Set | 22/212 34.3 | 22/212 44.8 | 70/392 28.4 | 70/392 29.6 |
| Tabor Abrasion (milligrams lost) | 327 | 176 | 270 | 148 |

The test data indicate elastomer compositions of the invention including Viton and Nitrile elastomers demonstrated substantial improvements in tensile strength, 50 percent modulus, 100 percent modulus, tear resistance and abrasion resistance. Although the elastomer compositions of the invention including acrylic and EPDM elastomers did not demonstrate an increase in tensile strength, they also demonstrated a substantial increase in their 50 percent and 100 percent moduli, almost double the die tear resistance, and at least double or triple the abrasion resistance, respectively.

Such compositions can be used, for example, to make improved rotating lip seals. Rotating lip seals are subject to abrasion wear and tearing, and the substantial improvements in tear and abrasion resistance demonstrated with the invention will contribute a substantial improvement to the life of rotating lip seals manufactured with such elastomers with no sacrifice in the physical characteristics of the lip seal structure and, in many cases, a significant improvement in the strength of the lip seal.

Examples 35, 36, and 37

Compositions according to the invention were made and tested with polyurethane elastomers, specifically a polyurethane elastomer sold under the trade name MILLATHANE HT by TSE Industries, Inc., of Clearwater, Florida. Each of the elastomer compositions of Examples 35, 36, and 37 included 100 parts of MILLATHANE HT polyurethane elastomer, 0.25 parts of Stearic acid, 70 parts of N-990 carbon black, one part of Silane 172, one-half part of AC617, and one part of LUPRCO 130 XL, a common composition for polyurethane elastomer including MILLATHANE HT. The composition of Example 35 contained no additives of this invention. The composition of Example 36 contained eight parts by weight of an additive of this invention including fibrillatable polytetrafluoroethylene and an effective amount of molybdenum disulfide. The composition of Example 37 included, in addition to eight parts by weight of the additive of this invention, including fibrillatable polytetrafluoroethylene that was incorporated into Example 36, thirty-two parts by weight of an additive of this invention including granular polytetrafluoroethylene. Thus, the compositions of Examples 35, 36, and 37 differ only in that the composition of Example 36 included eight parts by weight of a fibrillatable polytetrafluoroethylene additive of this invention which includes approximately three parts by weight of fibrillatable polytetrafluoroethylene to one part by weight of molybdenum disulfide, and the composition of Example 37 includes not only the eight parts of fibrillatable polytetrafluoroethylene additive but also thirty-two parts of non-fibrillatable polytetrafluoroethylene additive. The non-fibrillatable polytetrafluoroethylene additive of Example 37 included a slightly higher percentage of particulate polytetrafluoroethylene by weight than the weight percentage of molybdenum disulfide.

The physical properties of the base elastomer composition of Example 35 are compared with the physical properties of the elastomer composition of Examples 36 and 37 below.

| Physical Properties | EXAMPLE | | |
|---|---|---|---|
| | 35 | 36 | 37 |
| Hardness Shore A | 82 | 87 | 87 |
| 100% Modulus, psi | 1,579 | 1,371 | 915 |
| 200% Modulus, psi | — | — | 1,207 |
| 300% Modulus, psi | — | — | 1,323 |
| Tensile Strength, psi | 1,699 | 1,688 | 1,327 |
| Elongation, % | 122 | 177 | 302 |
| Tear Die C, pli | 117 | 298 | 366 |
| Cure Time 360° F. (minutes) | 10 | 8' | 8' |
| Tabor Abrasion % Loss 1000 Cycles H18 Wheel | Not Run | .230 | .272 |

The elastomers of Examples 36 and 37, and particularly the elastomer of Example 37, can be used in the sole of an athletic running shoe to substantially reduce the thickness of the material forming the sole and provide an almost 300 percent increase in tear resistance and toughness of the sole material, substantially extending the life of the running shoe in addition to reducing its weight.

Thus, elastomers usable with this invention include the polymers known generally as rubbers, including natural rubber and synthetic rubber elastomers, and other polymers capable of forming elastic solids with similar properties. More specifically, such elastomers include, in addition to natural rubber, styrene-butadiene rubber (SBR BUNA S), acrylonitrilebutadiene rubber (BUNA N), butyl rubber (IIR), ethylenepropylene rubber (EPDM), polyurethane elastomers (AU), cis-polybutadiene (BR), polychloroprene (Neoprene, CR), poly(epichlorohydrin) (CO), polyacrylate (ABR), silicone rubbers (SI), poly (fluorinated hydrocarbons) (FPM), olefin polysulfide (Thiokol, ET), poly isoprene (IR), and the like. The compositions of the invention can also include plasticizers and softeners, extenders, reclaimed rubber, inert fillers, reinforcing fillers, coloring materials, anti-oxidants, accelerators, and vulcanization actuators.

The particulate polytetrafluoroethylene used can be granular polytetrafluoroethylene, dispersion-type polytetrafluoroethylene capable of fibrillation or a blend of both granular and fibrillatable PTFE. Such PTFE materials are sold by the following companies under their respective trademarks:

|  | Trade Designation | Manufacturer |
| --- | --- | --- |
| Granular PTFE: | TL 115A | LNP Division of ICI Americas |
|  | WHITCON 2 | ICI Americas |
|  | FLUON L 169 | ICI PLC |
| Fibrillatable PTFE: | FLUON CD1 | ICI Americas |
|  | TEFLON K-10 | du Pont |

Compositions of the invention can include both granular and fibrillated polytetrafluoroethylene. Fibrillated polytetrafluoroethylene improves significantly the modulus of elasticity and tear strength of most elastomers and can improve the tensile strength of elastomers with low tensile strengths. Generally, with about 4 percent by weight of fibrillated PTFE, about 85 percent of its benefits can be obtained. It is believed that the more extended and complex surface of the fibrillated PTFE may provide additional mechanical entanglement and engagement with the elastomer. The improved tensile strength and modulus can be obtained in many cases with only a modest increase in the hardness and a modest reduction in the elasticity.

Fibrillated PTFE is the result of its manufacture, usually as a coagulated aqueous disperson, and in its fibrous form in the compositions of this invention can resemble small twisted and deformed webs of entangled fibers. FLUON CD1 is preferred over TEFLON K-10 because it seems to disperse more readily in the elastomer. Where it is desirable to maintain flexibility of the elastomer compositions of this invention, the fibrillated polytetrafluoroethylene desirably fibrillates to provide a high ratio between fiber length and fiber diameter. It has been found that FLUON CD1 fibrillates with a greater length-to-diameter ratio than other fibrillatable polytetrafluoroethylene and is preferable in elastomers where flexibility is a desirable characteristic.

As indicated above, it is believed that the manner in which the coagulated dispersion polymers that comprise fibrillated polytetrafluoroethylene are processed during their manufacture affects the structure of the fibrillatable PTFE particles and the ease with which they may be fibrillated into fibers having a high ratio of fiber length to fiber diameter. Although it is not clearly understood, it is further believed that altering manufacturing processes to reduce dense or hard layers on the outside of the PTFE polymer particles permits the particles to be drawn into longer and thinner fibers. Furthermore, it is believed that the fibrillated PTFE may undergo a volume reduction upon curing of the elastomer that may provide "prestressing effect" in the cured polymer composition in cooperation with its adherent molybdenum disulfide. Among the factors used in manufacturing coagulated dispersions that may affect the surface hardness of the coagulated dispersion particles are the processing steps used to avoid further agglomeration of the coagulated dispersion particles and to remove anti-agglomeration agents and water from, and dry, the coagulated dispersion particles. Use of high temperatures, for example, to remove lubricants and water and dry the coagulated disperson particles may tend to make the surface of coagulated disperson particles harder or more dense and render them more difficult to fibrillate.

Particulate, ground, or granular PTFE is generally finely ground and is the result of fracturing. Granular PTFE can effectively contribute the physical properties of polytetrafluoroethylene in products that do not require good tensile strength and modulus. The outer hull covering, for example, does not require these properties.

Where tensile properties are important, small amounts of fibrillated PTFE are desirably included to improve the tear strength, tensile strength, and modulus of most elastic products made with compositions of this invention. Products of the invention with increased tensile strength and modulus of elasticity generally have greater abrasion resistance, lower flexural hysteresis, or heat build-up in use, and increased durability where subjected to mechanical flexing and abrasion.

The procedure for determining the quantity of PTFE needed in many applications is first to determine the total quantity of PTFE that is desirable to achieve the PTFE properties of the composition that are desired, such as lubricity and abrasion resistance, solvent resistance and chemical inertness, heat resistance, tear strength, and the like. The modulus of elasticity of the composition can generally be improved without substantial deterioration of other properties by using, as a portion of the PTFE component, fibrillatable PTFE such as FLUON CD1 and TEFLON K-10.

In compositions where lubricity is disadvantageous, such as the treads of vehicle tires and military tank pads, quantities of fibrillated PTFE on the order of only about 4 percent by weight within the composition can achieve 85 percent of the improvement possible with the fibrillated PTFE. In tire compositions, for example, about 2 percent of fibrillated PTFE in natural rubber with up to no more than 10 percent ground PTFE can provide substantially increased life to vehicle tires without loss of their tractability. With elastomers having less strength such as butyl rubber up to about 6 percent of fibrillated PTFE with no more than 6 percent ground PTFE can provide increased life and durability. It is generally desirable to keep the quantity of fibrillated PTFE in such compositions as low as possible consistent with obtaining the needed properties. Fibrillatable PTFE is more difficult to mix with elastomers and generates more heat as it is mixed with the elastomers. The increased heat generated in mixing the components of a composition and fibrillating the PTFE component, for example, in a Banbury mixer tends to partially cure the elastomer during mixing and reduces the scorch resistance of the resulting composition on molding. Scorch resistance is a measure of the ability of an elastomeric composition to be uniformly curable and to resist a preferential curing at the surfaces of a mold into which heat is transferred. Such preferential curing generally increases the resistance of the cured portion of the product to heat transfer and inhibits uniform curing of the product interior without over heating adjacent the product surface. In this regard, FLUON CD1 seems to be preferable to TEFLON K-10; but both work well in the resulting composition. In addition, particulate PTFE having an average particle size of less than 40 microns is more readily dispersed.

The molybdenum disulfide used may be that sold, for example, by Amax, Inc., as technical fine grade molybdenum disulfide. While the effective amount of molybdenum disulfide may vary from composition to composition, the amount needed to effect uniform dispersion of particulate matter such as PTFE into the elastomer may be easily determined by adding the molybdenum disulfide and the polytetrafluoroethylene to the elastomer in the Banbury mixer until the PTFE becomes uniformly mixed with the elastomer. The molybdenum disulfide can be incorporated into compositions of this invention in many cases with only a minor effect on most of their physical properties.

In addition to permitting the uniform dispersion and fibrillation of significant amounts of particulate polytetrafluoroethylene material in elastomer materials, the molybdenum disulfide can provide a significant filler for the elastomer and can be used to contribute lubricity to the surface properties of a resulting elastic product. Furthermore, the molybdenum disulfide will reduce the heat buildup and partial curing of the elastomer during mixing of the composition and increase its scorch resistance.

Where elastic products of such compositions are subject to surface abrasion, for example, in applications such as lip seals for hydraulic and shaft seals, vane pump seals, valve seals, and the like, the elastomer at the surface may be abraded; but the surface exposed to abrasion can then become predominantly PTFE which is lubricious and highly abrasion resistant. To the extent PTFE is abraded from such elastic products by the roughness of opposed surfaces, such as the inner steel surfaces of hydraulic and compressed air cylinders, pumps, valves, etc., the transfer of PTFE to the opposing surfaces tends to fill the roughness, improve the seal, and reduce the friction between the moving parts, with the elasticity of the composition continuing to maintain an effective seal.

One application of the invention is to watercraft which are required to move through the water as fast as possible or with the greatest efficiency possible, and more particularly to an improved outer hull covering for such watercraft which provides, among other advantages, reduced drag caused by water resistance to such movements. In connection with the movement of any object underneath or across the surface of the water, there is a continuous force exerted against such movement which is measurable and is composed of several factors, one of which is friction. This resistance to movement through water is commonly termed "drag". With any "watercraft," which term is used in this application to mean any craft or other structure that can carry people or cargo underneath or over the surface of water, drag is a major concern because it is a significant factor in determining the maximum speed at which movement is possible as well as the efficiency of such movement in terms of cost, energy expended and the like.

In an effort to minimize drag and maximize our ability to efficiently move through water, much research has been done and continues to be done both in private industry and in civilian and military branches of government. This research involves not only variations in the design, weight and other characteristics of the watercraft themselves, but also work with paints and other coatings, solutions, and various methods attempting to decrease this water resistance to movement and thereby increase the efficiency of water travel.

Examples of such ongoing work are shown, for example, in U.S. Pat. Nos. 3,230,919; 3,575,123; 3,990,381; 4,073,983; 4,088,622; 4,088,623; 4,241,682; and French Patent No. 2,050,794.

Other problems with the watercraft besides drag are encountered which impair efficiency and inconvenience or endanger travelers or cargo on board such craft. One example is fouling, which refers to the buildup of foreign matter including grass or marine organisms such as algae, barnacles, and various shells which become attached to the underwater portion of the hull or other structure. A second problem is that sound travels readily through metal hulls of watercraft creating not only a nuisance, i.e., noise, but possibly a dangerous situation as with submarines and other military vessels.

In addition to the examples of the patents above, applicant is generally aware that research has been conducted at military and civilian facilities for many years in an effort to find an effective solution to efficient movement through water by watercraft, having lessened drag and eliminating problems such as fouling, sound transfer, repeated maintenance, and difficulties of repair and others.

Compositions, such as those in Example 1, can be prepared in the form of flattened layers or sheets and used as panels. These panels can correspond to patterns taken from the outer hull or surface of the watercraft, such that the sheet material is later assembled and adhered to a particular hull design or shape, much as a jigsaw puzzle. The possible thickness of applicant's covering layer is limited only by consideration such as cost, added weight, and the like. Applicant's preferred thickness range is about 0.1–0.5 inch, with about 0.1 inch being most preferred.

The preferred method of attachment is to adhere the covering layer to the outer surface of the craft by an adhesive such as, for example, those commonly used for bonding natural rubber and synthetic elastomers to metal and various other substrates. The bonding agent used with applicant's preferred ethylenepropylene terpolymer base material was a CA-40 brand bonding agent marketed by the 3M Company, which satisfies government specification MIL A 46050C TYPE 1 CLASS 1 for military use, and is known to bond ethylenepropylene polymers to metal substrates and themselves. Other adhesives and methods of attachment, of course, can be substituted with this or other base elastomers and are within the scope and contemplation of applicant's invention.

The preferred covering layer was attached directly to the metal substrate being covered such as the hull or other surface of a craft. An alternate embodiment is to use the covering layer to form the outer layer of a laminate structure. The object of such a laminate can be to achieve improved properties such as adhesion, specific gravity, durability or impact tolerance, heat insulation, sound attenuation or absorption, and others. Differences in construction such as, for example, a honeycomb inner layer can also be used if desired for a specific application.

The invention permits the compounding of compositions having improved properties in many other applications. For a simple example, if the object were to make a bumper to cushion the automobile door when it slams and to keep it from rattling when it is closed, the bumper must be hard enough to stay in its slot when the door is slammed; it must be soft enough to cushion the door, yet must have a sufficient modulus of elasticity to keep the door from rattling when it is closed; it must preferably last for the life of the car which can be expected to be on the order of five to ten years; and it must be inexpensive.

The first step in deciding upon the composition of such a rubber product would be to decide upon the physical properties, such as hardness, permanent set, resilience, tensile strength, and the like. One of the advantages of compositions of the invention is their greater tolerance to aging. The method of manufacture of the product must also be considered. Since such bumpers can have a simple shape, such as a polyhedron, it may be manufactured in simple molds from an extruded preparation of mixed composition cut into short blanks with a size sufficient to fill the mold under pressure. Thus, the composition may be extruded in the form of a uniform strip and should have good extruding characteristics. A quick cure is desirable for it is more economical than an extended cure; but it is desirable to avoid scorching and to obtain a composition that will not partially cure if it is not immediately molded. In addition, such bumpers will generally be rather thick; so the mixed rubber should be cured slowly enough that the outside does not cure long before the inside. Generally, determining a composition for any application requires trial and error and several mixes are formulated for testing in such applications.

Examples 41 and 42

Using the invention for such bumpers may, for example, lead to a composition including reclaimed tire rubber in 200 parts by weight, particulate PTFE in 50 to 100 parts by weight, an effective amount of molybdenum disulfide, and 10 parts by weight of antioxidants, sulfur, accelerator and fillers. Another formulation of the invention usable in such application may include 100 parts by weight oil extended, styrene-butadiene rubber, 50 to 100 parts by weight particulate PTFE, an effective amount of molybdenum disulfide, and 10 parts by weight antioxidant, sulfur, accelerators, and other fillers. With this invention, the resulting automobile door bumpers will have a substantially reduced tendency to squeak because of their surface lubricity.

This invention also permits the manufacture of elastomer products having different desirable physical characteristics in different portions of the product. FIGS. 1 and 2 illustrate one such product, an article 10 formed from an elastomer having a first portion 10a with first desirable physical properties and a second portion 10b with second desirable physical properties. The first portion 10a can be formed from a cured elastomer composition to provide an article body portion with the first desirable physical properties of the cured elastomer composition.

The second article portion 10b can be formed from the cured elastomer of said article body portion uniformly mixed with particulate polytetrafluoroethylene and particulate molybdenum disulfide and integrally joined with the article body portion 10a by cured elastomer.

The specific example of such an article shown in FIGS. 1 and 2 is a window molding 10 for the door of a "hard top" automobile. As shown in FIGS. 1 and 2, such a window molding 10 is manufactured to have two portions 10a and 10b. One portion 10a is comprised of a base elastomer which has been selected to provide freedom from compression set and durability as a window molding, to provide resiliency to permit compression by the automobile window glass as it is closed, and to provide sufficient force in its resistance to compression to maintain a seal between the window glass and the molding. Ethylenepropylene (EPDM) is one elastomer that can be used to provide such characteristics in this application, but other elastomers may also be acceptable in such applications. The other portion 10b of the composite product is comprised of the base elastomer used to make portion 10a; but it includes, in addition to the base elastomers, for example, about one part by weight of a PTFE additive of this invention, including an effective amount of molybdenum disulfide per each weight part of elastomer. Preferably, the PTFE additive includes three parts by weight of granular PTFE and one part by weight of molybdenum disulfide. The portion 10b forms the surface 10c of the window molding that engages the window glass when the window is closed. Because the portion 10b is substantially half elastomer and half PTFE, it is relatively hard; and it provides a lubricious surface 10c.

The operation of such a composite automobile door window molding is illustrated in FIG. 3. When the window glass 20 is closed, it is advanced into engagement with the window molding 10. The window glass 20 engages the extending portion 10b; and because it is relatively hard, portion 10b is compressed without significant deformation into the softer, more deformable body portion 10a of the window molding and provides a line contact seal with the window glass by its extending lubricious surface portion 10c. The force imposed on portion 10b by the resilience of body portion 10a maintains the lubricious surface 10c in contact with the window glass 20. Because the composite window molding 10 provides a relatively hard, lubricious surface 10c, it does not provide a deformable surface that tends to adhere to the window glass; and the automobile window may be more easily opened.

In the manufacture of such articles with the invention, an elastomer is mixed to form a first elastomer composition to provide first physical properties desirable in the first portion of the product; and the elastomer is mixed to provide a second elastomer composition with second desired physical properties. In the invention, additives of the invention may be mixed with the elastomer to form either the first elastomer composition, or the second elastomer composition, or both the first and second elastomer compositions.

For example, a first elastomer composition is mixed using a selected elastomer to provide the first physical properties desirable in a first portion of the product. The selected elastomer of the first elastomer composition is mixed with an additive of the invention comprising particulate polytetrafluoroethylene and particulate molybdenum disulfide to form a second elastomer composition, the particulate molybdenum disulfide having a majority of particles with sizes substantially smaller than the majority of particles of said particulate polytetrafluoroethylene and being in substantial part adherent to said polytetrafluoroethylene particles before addition to and mixing with the selected elastomer. The additive is selected to alter one or more physical properties of the selected elastomer to provide second physical properties that are desirable in a second portion of the product.

The first elastomer composition is formed or shaped for manufacture of the first portion of the product (see 10a of FIGS. 4A and 4B); and the second elastomer composition is formed or shaped for manufacture of the second portion of the product (see 10b of FIGS. 4A and 4B). The formed first elastomer portion of the product is placed together, with the formed second portion of the product, and the formed first elastomer portion and the second elastomer portion of the product are cured together to form an integral elastomer product having a first portion with first physical properties and a second portion with second physical properties.

FIG. 4A and 4B illustrate one manner in which a window molding like that shown in FIGS. 1-3 can be manufactured. As illustrated in FIGS. 4A and 4B, the first portion 10a of the window molding is formed from a long extrusion of uncured base elastomer; and the second portion 10b is formed from a long extrusion of a composition including the same base elastomer and about an equal part by weight of a PTFE-molybdenum disulfide additive of this invention. The portions 10a and 10b are placed together by joining their surfaces 10d and 10e, respectively. If necessary, liquid elastomer can be added to surface 10d or 10e or both 10d and 10e to provide "tack" where one or both of the product portions are highly loaded with additives. These two extrusions can be combined in a compression mold and cured together to form window molding 10. During molding, portions 10a and 10b are cured and fused together at the interface of surfaces 10d and 10e by the simultaneous curing of the base elastomer content of portions 10a and 10b providing an integral structure with no discernible interface as shown in FIG. 2. It may also be possible to coextrude the two portions 10a and 10b simultaneously.

Other composite articles may also be formed using the invention. Examples include windshield wiper blades and lip seals with flexible bodies and lubricious, long-wearing edges.

Other products of applicant's invention may include:

Example 43

A composition for use in the tread and sidewalls of an automobile tire comprising an elastomer selected from a group including a styrene butadiene rubber, natural rubber and the like in the range of about 88 weight percent to about 98 weight percent, fibrillated PTFE in the range of about 1 weight percent to about 4 weight percent, an effective amount of molybdenum disulfide, and one or more additives selected from a group comprising plasticizers and softeners, extenders, reclaimed rubber, inert fillers, carbon black, antioxidants, and accelerators and activators. Additional amounts of particulate granular PTFE in the range of 6 to 10 percent may be added along with corresponding amounts of MOS₂. For roadgraders and off-highway vehicles and machinery, higher percentages of granular PTFE may be incorporated into the tread composition.

Example 44

A composition for the seal of an hydraulic cylinder comprising neoprene in a range of about 50 weight percent to about 75 weight percent, a blend of particulate PTFE and fibrillated PTFE in the range of about 25 weight percent to about 50 weight percent, said fibrillated PTFE being present in an amount equal to about 4 weight percent of the total composition, an effective amount of molybdenum disulfide, the neoprene component containing one or more fillers selected from a group comprising plasticizers and softeners, inert fillers, carbon black, antioxidants, and accelerators or activators in an amount from about 5 percent to about 30 percent.

Example 45

A composition for a tank pad for a military tank comprising a styrene-butadiene copolymer elastomer, a blend of particulate PTFE and fibrillated PTFE in a range of about 2 weight percent to about 6 weight percent, an effective amount of molybdenum disulfide, and one or more curing agents selected for processibility.

Products of applicant's invention, for example, include spark plug wire and wire and cable insulation formed from the cured composition of Examples 10A and 10B, improved automobile tires including a bead, a casing, and a tread and sidewall with cured compositions of Examples 16 and 43, and O-ring seals formed from cured compositions of Examples 2 and 34, lip seals for an hydraulic cylinder formed from the cured composition of Examples 16, 32, and 44, and a tank pad for a military tank molded from the cured composition of Example 45 and soles for athletic shoes formed from the cured composition of Examples 36 and 37. These products can each provide improved life and durability in their applications that is several times that obtainable with compositions known prior to the invention.

The products listed above are not the only products that may be made with the invention. Using the invention, other compositions including elastomers and polytetrafluoroethylene may be compounded to provide the products above or any of the following products: windshield wiper blades, combination bearingseals for a rotating shaft, pump seals, valve seals, static body seals (e.g., door seals) for automobiles, and other such dynamic seals where lubricity, corrosion and/or abrasion resistance can be desirable. These products and others may be made with compositions of this invention by the manufacturing techniques and processes in common use in industry. Such products may be either extruded or molded by transfer, injection and compression molding and the like or both.

Additional advantages of and applications for compositions of the invention are being discovered; and the interaction between the polytetrafluoroethylene and molybdenum disulfide particles in the additives, methods, and compositions of this invention is not completely understood and is still being studied. Other specific products, compositions, methods and other embodiments may be devised without departing from the spirit and scope of the invention as set forth in the following claims.

I claim:

1. An additive, consisting essentially of:
   a fibrillatable particulate polytetrafluoroethylene and particulate molybdenum disulfide, said particulate molybdenum disulfide having particle sizes substantially smaller than the average particle size of said particulate polytetrafluoroethylene with a substantial majority of the molybdenum disulfide particles having sizes less than about one-tenth the median particle size of the fibrillatable particulate polytetrafluoroethylene, said particulate molybdenum disulfide particles being in substantial part adherent to said fibrillatable particulate polytetrafluoroethylene.

2. The additive of claim 1 wherein the average particle size of said molybdenum disulfide is less than about one-third the average particle size of said granular particulate polytetrafluoroethylene and said granular polytetrafluoroethylene has an average particle size in the range of from about 2 to about 45 microns.

3. The additive of claim 1 wherein the particulate molybdenum disulfide is present in the additive in a weight amount equal to about one-third of the weight of the fibrillatable polytetrafluoroethylene.

4. The additive of claim 3 wherein the particulate fibrillatable polytetrafluoroethylene has been so processed that it is capable of extrusion through a small orifice with applied pressures of less than about 12,000 psi.

5. The additive of claim 1 wherein said particulate polytetrafluoroethylene is granular polytetrafluoroethylene and said molybdenum disulfide comprises at least about 0.33 parts by weight per part of granular polytetrafluoroethylene.

6. The additive of claim 3 wherein the average particle size of the molybdenum disulfide is less than about one-twentieth the average particle size of the fibrillatable polytetrafluoroethylene.

7. The additive of claim 1 produced by placing together said fibrillatable particulate polytetrafluoroethylene and particulate molybdenum disulfide, said particulate molybdenum disulfide having said substantially smaller particle size than said particulate polytetrafluoroethylene and comprising at least a substantial percentage by weight of the total weight of the additive, and producing relative movement and contact between said fibrillatable particulate polytetrafluoroethylene and said particulate molybdenum disulfide to produce said fibrillatable particulate polytetrafluoroethylene with adherent particles of molybdenum disulfide.

8. The additive of claim 7 wherein said particulate polytetrafluoroethylene and particulate molybdenum disulfide are tumbled together in a tumble mixer.

9. The additive of claim 7 wherein the particles of polytetrafluoroethylene are provided with hundreds of very fine particles of molybdenum disulfide.

10. An additive for elastomers, comprising fibrillatable polytetrafluoroethylene particles of a soft coagulated dispersion extrusion polymer capable of extrusion through a small orifice with applied pressures of about 12,000 psi. and less and having an average particle size in the range of about 100 to 600 microns and molybdenum disulfide particles having an average particle size in the range of about 1 to about 10 microns and being at least in part adherent to said fibrillatable polytetrafluoroethylene particles.

11. The additive of claim 10, further comprising granular polytetrafluoroethylene particles of cryogenically ground polymer having an average particle size in the range of about 10 to about 45 microns and molybdenum disulfide particles having an average particle size in the range of about 1 to about 4 microns and being at least in part adherent to said granular polytetrafluoroethylene particles.

12. The additive of claim 1 wherein the particulate molybdenum disulfide is present in the additive in an effective weight amount less than about ⅓ of the weight of the fibrillatable PTFE.

13. The additive of claim 7 wherein the particulate molybdenum disulfide is present in the additive in an effective weight amount less than about ⅓ of the weight of the fibrillatable PTFE.

14. The additive of claim 10 wherein the molybdenum disulfide particles are present in the additive in an effective weight amount less than about ⅓ of the weight of the fibrillatable PTFE.

* * * * *